United States Patent [19]
Hyodo

[11] Patent Number: 4,718,296
[45] Date of Patent: Jan. 12, 1988

[54] SAFETY STEERING SHAFT OF A VEHICLE

[75] Inventor: Youichi Hyodo, Okazaki, Japan

[73] Assignee: Toyota Jidosha Kabushiki Kaisha, Aichi, Japan

[21] Appl. No.: 926,526

[22] Filed: Nov. 4, 1986

[30] Foreign Application Priority Data

Nov. 8, 1985 [JP] Japan ............................. 60-170875[U]

[51] Int. Cl.$^4$ .............................................. B62D 1/18
[52] U.S. Cl. ..................................... 74/492; 188/371; 280/777
[58] Field of Search ................... 74/492, 493; 188/371, 188/373; 280/777

[56] References Cited

U.S. PATENT DOCUMENTS

| | | | |
|---|---|---|---|
| 3,457,800 | 7/1969 | Toshida et al. | 280/777 X |
| 3,468,182 | 9/1969 | Shwartzberg | 188/371 X |
| 3,813,961 | 6/1974 | Hug | 74/492 |
| 3,934,486 | 1/1976 | Becker et al. | 74/492 |
| 3,934,897 | 1/1976 | Moos | 74/492 X |
| 3,960,031 | 6/1976 | Chometon et al. | 74/492 |
| 4,040,646 | 8/1977 | Becker | 74/492 X |

FOREIGN PATENT DOCUMENTS 2604008 8/1977 Fed. Rep. of Germany .
51-102759 9/1976 Japan .

Primary Examiner—Allan D. Herrmann
Attorney, Agent, or Firm—Parkhurst & Oliff

[57] ABSTRACT

A steering shaft deformable in response to a force corresponding to frontal impact of a vehicle. The steering shaft includes an upper shaft, a lower shaft and a deformable plate. The upper shaft and the lower shaft are fixed on the deformable plate at a first position and a second position, respectively. The first position and the second position are perpendicularly offset from an axis of the steering shaft. Means for controlling deformation of the deformable plate is formed in the deformable plate between the first position and the second position. The means can be a slit, a hole or a groove. When the steering shaft receives a force corresponding to frontal impact of the vehicle, the deformable plate deforms along the means causing attenuation of the force as well significant absorbtion of the impact energy. Such a steering shaft can be mounted on the vehicle without significantly increasing the space required for mounting the steering device.

9 Claims, 12 Drawing Figures

SAFETY STEERING SHAFT OF A VEHICLE

BACKGROUND OF THE INVENTION

1. Field of the Invention

The present invention relates to a safety steering shaft of a vehicle and specifically relates to a steering shaft deformable in response to a force corresponding to frontal impact of the vehicle for extremely weakening the force.

2. Description of the Prior Art

Two typical types of safety steering shaft for weakening a force correspondng to frontal impact on a vehicle are known. One is a disengagement type coupling which disengages when it receives an excessively large force corresponding to frontal impact of the vehicle. A device of this type is disclosed in Japanese Patent Publication No. SHO 51-102759 and U.S. Pat. No. 3,960,031. The other type of safety steering shaft known heretofore is a device including a deformable member which can deform permanently and weaken a transmitted force by permanent deformation when it receives a force corresponding to frontal impact of the vehicle. A device of this type is disclosed in U.S. Pat. No. 3,457,800. Devices of the latter type are superior to devices of the former type insofar as devices of the latter type can transmit steering force to a car wheel after it has deformed. The present invention relates to a device of the latter type.

In the past, devices of the latter type which include a deformable member have occupied a large space making it difficult to mount the device in a vehicle where space is limited. This is especially true in a vehicle having a front engine front drive system. For example, a steering shaft which includes a deformable bellows portion requires a considerably long bellows portion occupying large space to ensure adequate energy absorption. If the bellows portion is shortened, deformation of the portion becomes difficult and the amount of absorbed energy becomes undesirably small.

SUMMARY OF THE INVENTION

An object of the present invention is to provide a steering shaft including a deformable member which does not require a large space for mounting on a vehicle.

The above object can be attained, according to the present invention, by provision of a steering shaft which is deformable in response to a force corresponding to frontal impact of a vehicle comprising (a) an upper shaft including an upper yoke at an upper end portion of the upper shaft, (b) a lower shaft provided with a lower yoke at a lower end portion of the lower shaft, a line extending between a pivot center of the upper yoke and a pivot center of the lower yoke defining an axis of the steering shaft, and (c) a deformable plate deformable in response to a force corresponding to frontal impact of the vehicle, the deformable plate being perpendicular to the axis of the steering shaft, a lower end portion of the upper shaft and an upper end of the lower shaft being fixed to the deformable plate at a first position and a second position, respectively, said first position and said second position being perpendicularly offset from the axis of the steering shaft, the deformable plate having means for controlling deformation of the deformable plate between the first position and the second position. The means for controlling deformatio of the deformable plate may be a split, a prolonged hole or a groove.

In accordance with the present invention, when the steering shaft receives, from the lower end of the steering shaft, an excessively large axial force corresponding to a frontal impact of the vehicle, the steering shaft is axially pushed toward the car interior, opposed pushing or deformation forces from the upper shaft and the lower shaft act on the deformable plate at the first position and the second position, respectively. Receiving the above pushing or deformation forces, the deformable plate undergoes a permanent bending deformation extremely attenuates the pushing or deformation force acting toward the car interior. The means for controlling deformation of the deformable plate encourages deformation of the deformable plate and controls the direction of the deformation. Since the deformable plate has a diameter which is no longer than that of the outermost surface of the yokes, provision of the deformable plate of the present invention does not require an increase in space beyond the space occupied by a conventional steering shaft.

BRIEF DESCRIPTION OF THE DRAWINGS

These and other objects and advantages of the invention will become more apparently and more readily appreciated from the following detailed description of the presently preferred exemplary embodiments of the invention taken in conjunction with the accompanying drawings, of which.

DETAILED DESCRIPTION OF THE PREFERRED EMBODIMENTS

Figure 1:
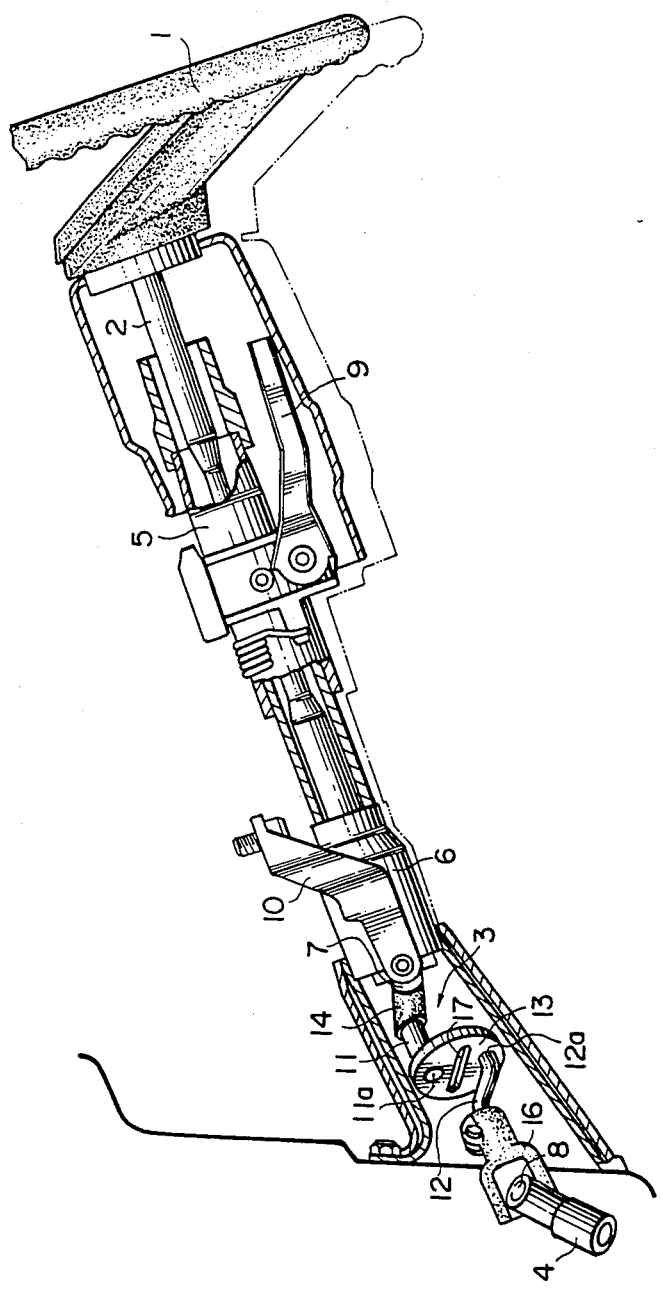
FIG. 1 is a side view of a steering device of a vehicle which includes a steering shaft according to the present invention.

FIG. 1 shows the structure of a steering shaft and members adjacent to the steering shaft in a steering device of a vehicle according to the present invention. A steering wheel 1 is connected to a main shaft 2 which is rotatably coupled to an intermediate shaft 3. Intermediate shaft 3 is rotatably connected to a connecting rod 4 which extends to a gear box (not shown). Steering force applied to the steering wheel 1 is transmitted via main shaft 2, intermediate shaft 3 and connecting rod 4 to gears housed in the gear box through twisting moments of main shaft 2, intermediate shaft 3 and connecting rod 4. then force is then transmitted from the gear box to the car wheels. Main shaft 2 is surrounded by an upper column tube 5 and a lower column tube 6 which are axially slidable relative to each other. Main shaft 2 is supported rotatably around the axis by upper column tube 5 and lower column tube 6. Main shaft 2 and intermediate shaft 3 are coupled through a universal joint 7, and intermediate shaft 3 and connecting rod 4 are coupled through a universal joint 8. A line passing through the pivot center of universal joint 7 and the pivot center of universal joint 8 defines an axis of intermediate shaft 3. Reference numeral 9 shows a tilt lever for tilting upper column tube 5 and lower column tube 6 around a tilting axis. Lower column tube 6 is supported by lower bracket 10 from the body of the vehicle. Intermediate shaft 3 extends obliquely and in a vertical direction when it is mounted on the vehicle. The present invention is applied to intermediate shaft 3.

Figure 2:
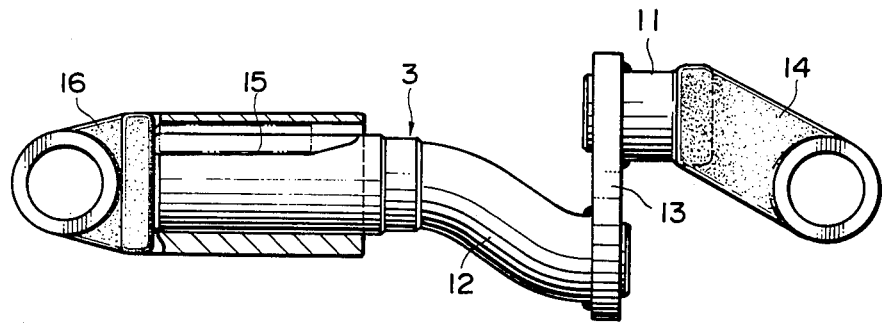
FIG. 2 is a side view of the steering shaft according to the present invention.
Figure 3:
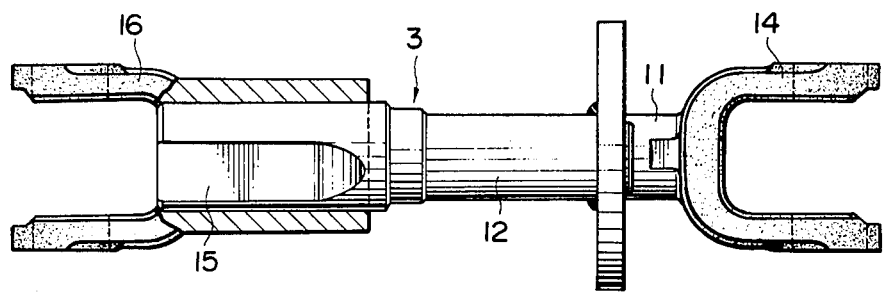
FIG. 3 is a plan view of the steering shaft of FIG. 2.

Intermediate shaft 3 constitutes the steering shaft of the present invention. As shown in FIGS. 2 and 3, the steering shaft 3 of the present invention comprises an upper shaft 11, a lower shaft 12 and a deformation plate 13 deformable in response to a force corresponding to frontal impact of the vehicle. Upper shaft 11 and lower shaft 12 are fixed to deformable plate 12.

Upper shaft 11 includes an upper yoke 14 at its upper end portion. The upper yoke 14 also functions as one portion of universal joint 7. Upper yoke 14 is integrally formed with a rod portion of upper shaft 11. The rod portion of upper shaft 11 is perpendicular offset fromt he axis of steering shaft 3 and extends straight and parallel with respect to the axis of steering shaft 3. The pivot center of upper yoke 14 is coincident with the pivot center of universal joint 7 and the axis of steering shaft 3 passes through the pivot center of upper yoke 14.

Lower shaft 12 is provided with a lower yoke 16 at a lower end portion or lower shaft 12. Lower yoke 16 is axially slidably coupled with the lower end portion of lower shaft 12 through a key and key-groove 15 or a spline which prevents rotation of the yoke 16 relative to shaft 12. Lower yoke 16 constitues one portion of lower shaft 12 and also functions as one portion of universal joint 8. The pivot center of lower yoke 16 is coincident with the pivot center of universal joint 8 and the axis of steering shaft 3 passes through the pivot center of lower yoke 16. Therefore, the axis of steering shaft can be defined by a straight line passing the pivot center of upper yoke 14 and the pivot center of lower yoke 16. The lower end portion of lower shaft 12 where lower yoke 16 is slidably coupled is aligned with the axis of steering shaft 3 and an upper end portion of lower shaft 12 is bent so as to be perpendicularly offset from the axis of steering shaft 3.

Deformable plate 13 is constructed of a circular, flat steel plate and is arranged so as to be perpendicular to the axis of steering shaft 3. The lower end portion of upper shaft 11 and the upper end portion of lower shaft 12 are fixed to deformable plate 13. Deformable plate 13 has a first hole centered at a first position 11a and a second hole centered at a second position 12a. The first and second positions 11a, 12a are both perpendicularly offset from the axis of steering shaft 3 and are positioned symmetrically to each other with respect to the axis of steering shaft 3. The lower end portion of upper shaft 11 penetrates the first hole at first position 11a and is fixed to deforamble plate 13 by welding. Similarly, the upper end portion of lower shaft 12 penetrates the second hole at second position 12a and is fixed to deformable plate 13 by welding. The axis of upper shaft 11, the axis of lower shaft 12 and the axis of steering shaft 3 lie on a single plane, i.e., the axes are coplanar.

Figure 4:
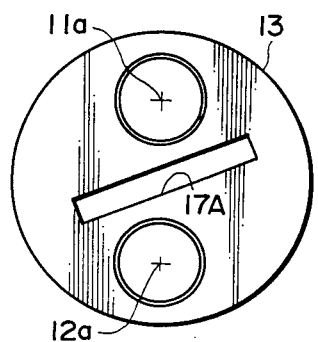
FIG. 4 is a front view of a deformable plate having an oblique slit according to a first example of the present invention.
Figure 5:
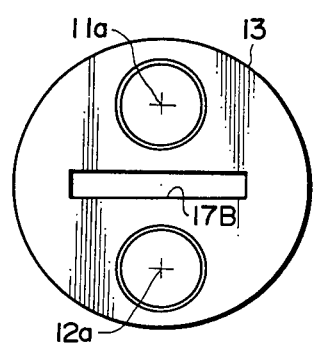
FIG. 5 is a front view of a deformable plate having a perpendicular slit according to a second example of the present invention.
Figure 6:
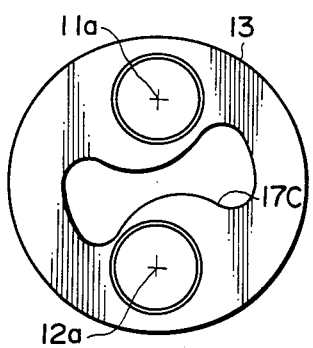
FIG. 6 is a front view of a deformable plate having an oblique hole according to a third example of the present invention.
Figure 7:
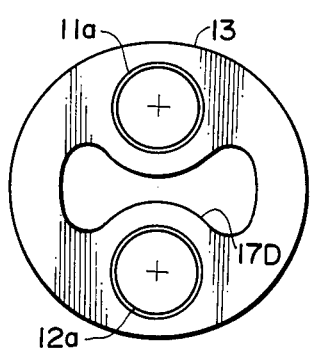
FIG. 7 is a front view of a deformable plate having a perpendicular hole according to a fourth example of the present invention.
Figure 8:
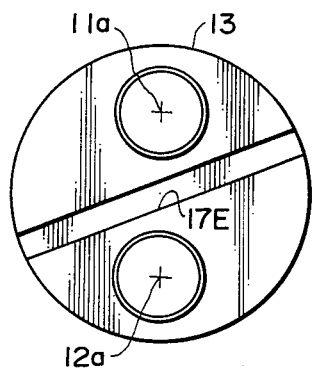
FIG. 8 is a front view of a deformable plate having an oblique groove according to a fifth example of the present invention.
Figure 9:
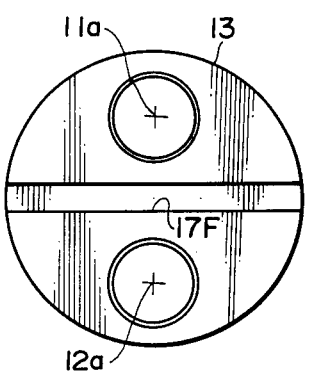
FIG. 9 is a front view of a deformable plate having a perpendicular groove according to a sixth example of the present invention.

Deformable plate 13 has means 17 for controlling deformation of deformable plate 13 between first position 11a and second position 12a. The center of means 17 is coincident with the axis of steering shaft 3 and means 17 is formed symmetric with respect to the axis of steering shaft 3. Means 17 is constructed of a slit 17A or 17B formed in deformable plate 13 as shown in FIGS. 4 and 5, respectively, or a hole 17C or 17D formed in deformable plate 13 as shown in FIGS. 6 and 7. Means 17 may further be constructed of a groove 17E or 17F formed in deformable plate 13 as shown in FIGS. 8 and 9, respectively. Slit 17A or FIG. 4 is a rectangular slit and extends obliquely with respect to a straight line extending between first position 11a and second position 12a. Slit 17B of FIG. 5 is a rectangular slit and extends perpendicularly to a straight line extending between first position 11a and second position 12a. Hole 17C of FIG. 6 is a prolonged hole having a small width portion at a mid-portion of the hole and a large width portion at both end portions of the hole. Hole 17C extends obliquely with respect to a straight line extending between first position 11a and second position 12a. Hole 17D of FIG. 7 is a hole having a shape similar to that of hole 17C which extends perpendicularly to a straight line extending between first position 11a and second position 12a. Groove 17E of FIG. 8 is a groove having a depth smaller than the thickness of deformable plate 13 and extending obliquely with respect to a straight line extending between first position 11a and second position 12a. Groove 17F of FIG. 9 extends perpendicularly with respect to a straight line extending between first position 11a and second position 12a. When means 17 extends obliquely to a straight line extending between first position 11a and second position 12a, and an excessively large impact force is received, deformable plate 13 is bent such that the direction of deformation is twisted from the plane including the axes of upper shaft 11 and lower shaft 12 is the non-deformed state. Thus, interference of deformable plate 13 with upper shaft 11 or lower shaft 12 will be substantially prevented to allow a large amount of deformation of steering shaft 13.

The diameter of deformable plate 13 is, preferably, not larger than the diameter of an imaginary cylinder enveloping and contacting both a contour or outer surface of the upper yoke 14 and lower yoke 16. Deformable plate 13 may have a diameter equal to the diameter of said imaginary cylinder, but in such a case, the diameter of deformable plate 13 should be as small as possible since a steering device having a deformable plate with a small diameter is easily mounted in a vehicle.

Figure 10:
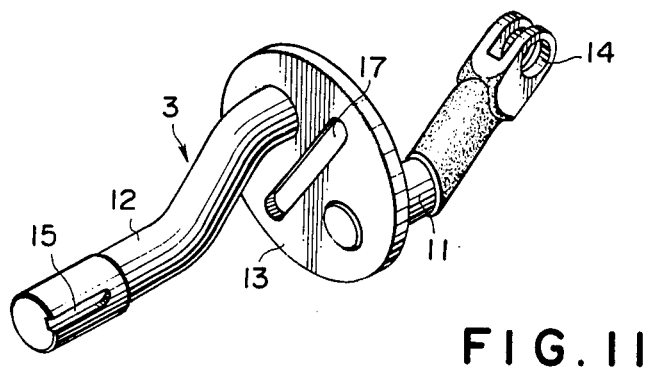
FIG. 10 is an oblique view of the steering shaft of FIG. 2 before deformation.
Figure 11:
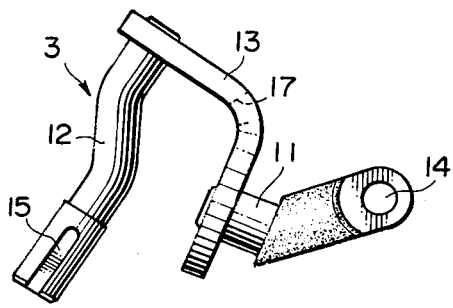
FIG. 11 is an oblique view of the steering shaft of FIG. 2 after deformation.
Figure 12:
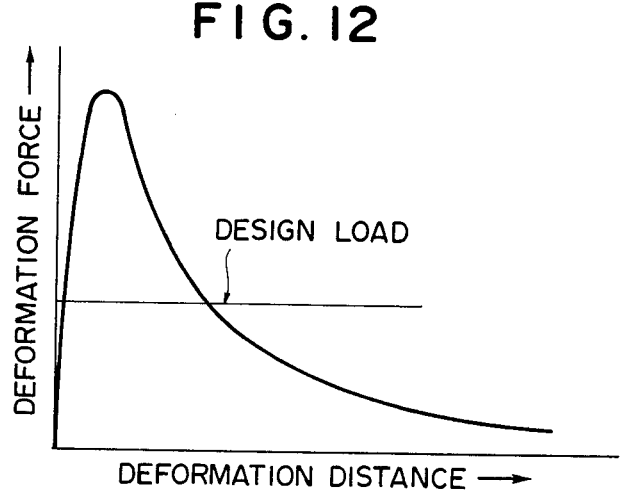
FIG. 12 is a graph showing the relationship between deformation distance and deformation force of the steering shaft of the present invention.

Next, the operational characteristics of the above-mentioned steering device will be explained with reference to FIGS. 10 to 12.

When the steering device of the present invention including steering shaft 3 receives a force corresponding to frontal impact of the vehicle, upper shaft 11 and lower shaft 12 push deformable plate 13 in opposite directions causing permanent bending deformation of plate 13. For example, FIG. 10 shows shaft 3 prior to deformation of plate 13 and FIG. 11 shows shaft 3 after deformation of plate 13. The bending deformation occurs along means 17 which controls the direction of deformation and makes the occurrence of deformation feasible, because the rigidity of the plate portion which is proximate the slit, prolonged hole or groove is less than the rigidity of other parts of deformable plate 13. FIG. 12 shows the relationship between the amount of deformation of deformable plate 13 (in terms of deformation distance) and the deformation force acting on the steering shaft 3. As will be understood from FIG. 12, the deformation force on steering shaft 3 increases up to a certain value of deformation of the steering shaft 3 beyond which the deformation is rapidly attenuated in the range of deformation distance near the certain value corresponding to the point where the deformation of deformable plate 13 changes from elastic deformation to plastic deformation. The deformation force on steering shaft 3 in the region of plastic deformation of deformable plate 13 is quite small and the deformation force toward the car interior is significantly reduced, thereby preventing main shaft 12 fixedly and rotatably supported from moving toward a driver and effectively protecting a driver from the force resulting from frontal impact of the vehicle. Further, the plastic deformation of deformable plate 13 assures a large distance of deformation of the steering device so that a large amount of energy of frontal impact of the vehicle is absorbed. After the permanent deformation of deformable plate 13, steering control from the steering wheel to the car wheels is maintained unlike a disengaging coupling. Therefore, in a steering device including the steering shaft 3 of the present invention it is not necessary to investigate whether disengagement of a coupling may have resulted from such a frontal impact of the vehicle.

Since deformable plate 13 has a diameter almost equal to that of outermost surfaces (or contours) of upper yoke 14 and lower yoke 16, provision of steering shaft 3 having a deformable plate 13 does not increase the space needed for mounting steering shaft 3 beyond that required for a conventional steering shaft having no shock attenuating and absorbing device.

According to the present invention, the following advantages are obtained.

The space for mounting the steering shaft 3 of the present invention is very small and a device for attenuating an impact force and absorbing impact energy can be mounted on the vehicle without increasing the space required in a conventional steering device having no such safety means.

The design force at which the deformation is attenuated can be easily adjusted by selecting suitable dimensions and shapes for means 17 formed in deformable plate 13.

Deformation of deformable plate 13 can occur at a selected force more accureately than other, conventional, devices and enhanced operative reliability can be obtained.

Since the steering shaft 3 including deformable plate 13 is constructed of metal, its operative characteristics do not change due to thermal environmental conditions, while a conventional device using a rubber means is subject to change in operative characteristics.

Steering shaft 3 has a very simple construction in contrast to other, conventional, devices thus reducing manufacturing cost.

Steering shaft 3 still has ability to transmit steering control after deformation.

Although only a few exemplary embodiments of the present invention have been described in detail above, those skilled in the art will readily appreciate that many modifications are possible in the exemplary embodiments without materially departing from the novel teachings and advantages of the invention. Accordingly, all such modifications are intended to be included within the scope of the present invention as defined in the following claims.

What is claimed is:

1. A steering shaft which is deformable in response to a force corresponding to frontal impact of a vehicle comprising:
    an upper shaft having upper and lower end portions, said upper shaft including an upper yoke at said upper end portion of the upper shaft, said upper yoke having a pivot center;
    a lower shaft having upper and lower end portions, said lower shaft provided with a lower yoke at said lower end portion of the lower shaft, said lower yoke having a pivot center;
    an axis of said steering shaft being defined by a line extending between said pivot center of the upper yoke and said pivot center of the lower yoke; and
    a deformable plate which is deformable in response to a force corresponding to frontal impact of the vehicle, said deformable plate being perpendicular to the axis of the steering shaft, said lower end portion of the upper shaft and said upper end portion of the lower shaft being fixed to the deformable plate at a first position and a second position, respectively, said first position and said second position being perpendicularly offset from the axis of the steering shaft, said deformable plate having means for controlling deformation of the deformable plate located between the first position and the second position.

2. The steering shaft of claim 1 wherein said means for controlling deformation of the deformable plate is a slit formed in the deformable plate.

3. The steering shaft of claim 1 wherein said means for controlling deformation of the deformable plate is a hole formed in the deformable plate.

4. The steering shaft of claim 1 wherein said means for controlling deformation of the deformable plate is a groove formed in the deformable plate.

5. The steering shaft of claim 1 wherein said means for controlling deformation of the deformable plate extends obliquely with respect to a straight line extending between said first position and said second position.

6. The steering shaft of claim 1 wherein said means for controlling deformation of the deformable plate extends perpendicularly with respect to a straight line extending between said first position and said second position.

7. The steering shaft of claim 1 wherein said deformable plate is a circular plate having a diameter which is no larger than the diameter of an imaginary cylinder having the smallest diameter capable of enveloping both the outermost surface of the upper yoke and the outermost surface of the lower yoke.

8. The steering shaft of claim 1 wherein said upper yoke is integrally connected to the upper shaft and said lower yoke is axially slidably connected to the lower shaft.

9. The steering shaft of claim 1 wherein said upper yoke functions as one portion of an upper universal joint via which the upper shaft is rotatably connected with a lower steering column of the vehicle, and said lower yoke functions as one portion of a lower universal joint via which the lower shaft is rotatably connected with a connecting rod extending toward a gear box of the vehicle.

* * * * *